(No Model.)
W. H. CARTER.
HAY KNIFE.
No. 297,753. Patented Apr. 29, 1884.
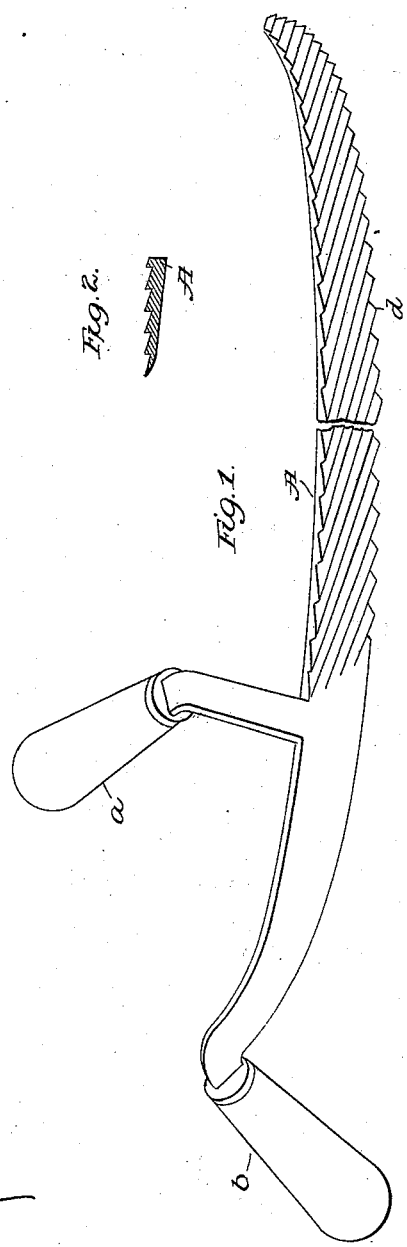

UNITED STATES PATENT OFFICE.

WALLACE H. CARTER, OF HALLOWELL, MAINE.

HAY-KNIFE.

SPECIFICATION forming part of Letters Patent No. 297,753, dated April 29, 1884.

Application filed January 9, 1884. (No model.)

*To all whom it may concern:*

Be it known that I, WALLACE H. CARTER, of Hallowell, in the county of Kennebec and State of Maine, have invented a new and useful Improvement in Hay-Knives; and I do hereby declare that the following is a full, clear, and exact description of the same.

My invention is an improvement upon hay-knives of that class in which a blade is provided with a serrated or sickle edge; and it consists in combining, with a curved blade having a handle or handles adapted to give it a downward thrust, a series of grooves arranged diagonally of the blade-edge on one side, and extending across the whole surface of the blade, the said diagonal arrangement of the grooves being such that when the knife is pressed downward the grooves will be in approximately vertical position.

It further consists in a peculiar formation of the grooves, as hereinafter set forth.

In the accompanying drawings, Figure 1 represents a side elevation of the knife; Fig. 2, a cross-section on line *x x* of Fig. 1.

The blade A is of curved or sword shape, and has ordinary handles, *a b*, by means of which it may be pressed downward vertically through the hay to shear off a section from the face or edge. The shape of the knife as ordinarily made is such that when so pressed down it has a tendency to move off laterally in the direction to which the point turns, which causes the edge to slip over the hay without cutting effectually. It is impracticable or inconvenient to apply by means of the handles the required lateral pressure simultaneously with the downward pressure; and in order to give this lateral pressure, or, in other words, to hold the edge to its work and prevent too much lateral movement in the direction of the point, I groove the curved blade, as shown at *c c*, these grooves running at an acute angle with the edge. The grooves are made sufficiently large and deep to receive the edges of the cut hay, by which the blade is guided and held sufficiently to the work to cut effectually. The grooves also form a sickle-edge; but their main function is to guide the movement of the knife and hold the edge to its work.

I have also modified the form of the groove, as shown more clearly in Fig. 2. As shown, they have an inclined and a nearly-vertical side. The vertical side is toward the point or beak and the inclined side toward the curved edge. This gives chisel-edges *d*, and the inclined side of the grooves allows some lateral movement, but holds with this form of edge the blade sufficiently to the hay. The edges in this form of grooving are a series of s ant edges, which meet the hay at a slight angle and give a somewhat drawing cut.

I do not of course claim a curved hay-knife, nor a sickle-edge on a hay-knife, but only the special construction shown herein.

I am also aware that a straight hay-knife has been made with a sickle-edge, as in the patent of Fisher of October 14, 1879. The grooves, being only upon the thinned or beveled edge in this case, do not serve the purpose of the grooves in mine, and I make no claim to any such knife as that shown in the said patent.

I claim—

1. A hay-knife having a curved blade, A, provided on one side with grooves *c c*, running at an acute angle to the edge and quite across the blade, all substantially as described.

2. In a curved hay-knife, a series of grooves inclined on the side toward the edge and approximately vertical on the other, and extending quite across the blade, as and for the purpose set forth.

In testimony whereof I have signed my name to this specification in the presence of two subscribing witnesses.

WALLACE H. CARTER.

Witnesses:
CHAS. L. ANDREWS,
F. J. DAY, Jr.